No. 744,313. PATENTED NOV. 17, 1903.
J. R. DUHACHEK.
CORN SHELLER.
APPLICATION FILED MAY 18, 1903.
NO MODEL.
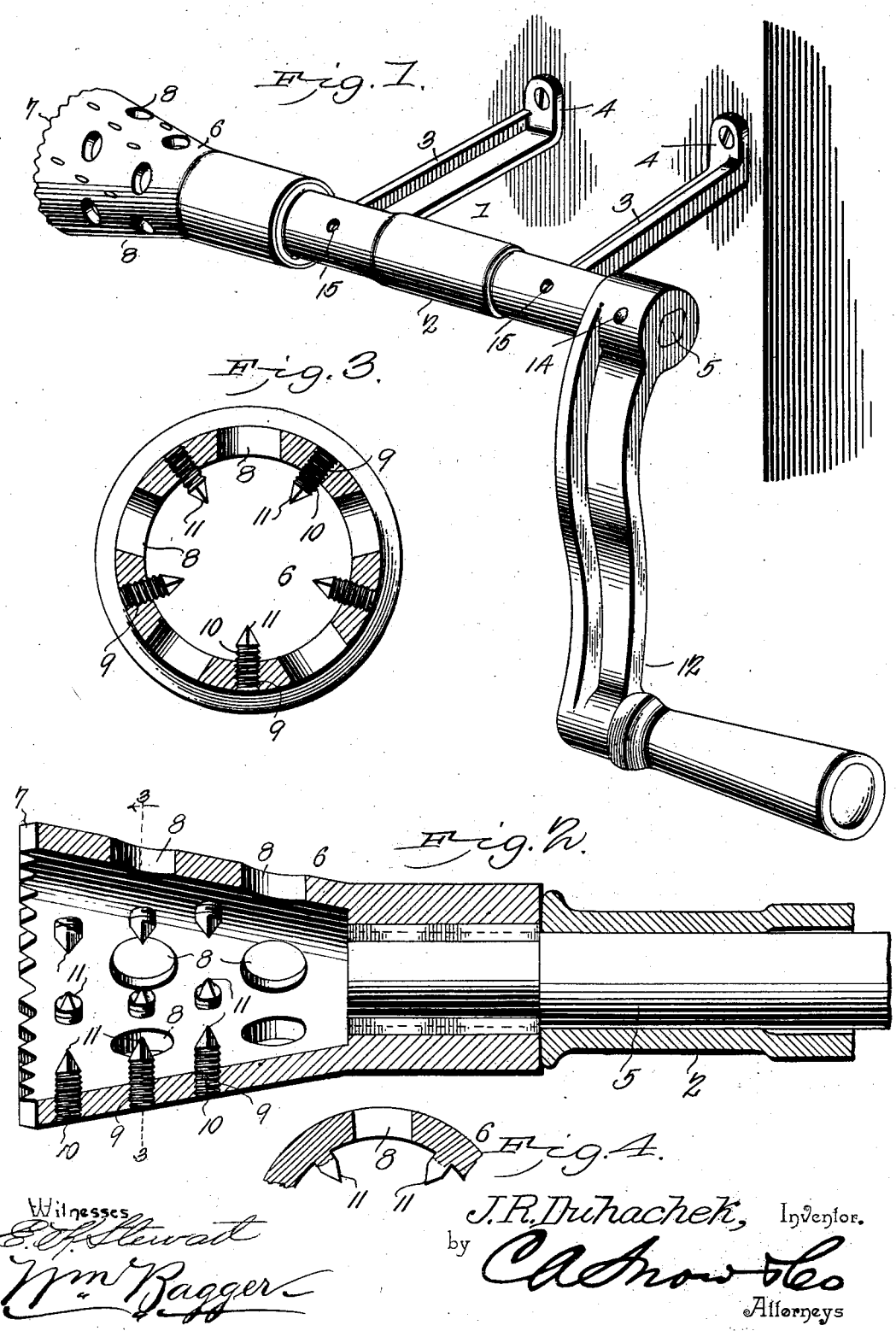

No. 744,313. Patented November 17, 1903.

UNITED STATES PATENT OFFICE.

JOSEPH R. DUHACHEK, OF EMERICK, NEBRASKA.

CORN-SHELLER.

SPECIFICATION forming part of Letters Patent No. 744,313, dated November 17, 1903.

Application filed May 18, 1903. Serial No. 157,691. (No model.)

*To all whom it may concern:*

Be it known that I, JOSEPH R. DUHACHEK, a citizen of the United States, residing at Emerick, in the county of Madison and State of Nebraska, have invented a new and useful Corn-Sheller, of which the following is a specification.

This invention relates to corn-shellers, and has especial reference to that class of corn-shellers which are adapted to be operated by hand, and more especially for the purpose of shelling seed-corn or, more properly, for the purpose of removing from the ends of the ears the small seeds which it is desired to separate out from the corn, the large seeds which are usually found upon the central and lower portion of the cob being retained and afterward removed for seeding purposes.

My invention has for its object to provide a device of this class which shall possess superior advantages in point of simplicity, durability, and general efficiency; and with these objects in view the invention consists in the improved construction, arrangement, and combination of parts, which will be hereinafter fully described, and particularly pointed out in the claims.

In the accompanying drawings, Figure 1 is a perspective view of a corn-sheller constructed in accordance with the principles of my invention. Fig. 2 is a longitudinal sectional view taken through the shelling-cone. Fig. 3 is a transverse sectional view taken on the line 3 3 in Fig. 2. Fig. 4 is a detail view showing the teeth 11 formed integrally with the shelling-cone.

Corresponding parts in the several figures are indicated by similar numerals of reference.

In carrying out my invention I provide a frame 1, consisting of a tubular bearing 2, from the ends of which project arms 3, terminating in perforated lugs 4, adapted to receive screws or bolts by means of which the device may be mounted in position for operation. 5 designates a shaft journaled in the tubular bearing 2 and carrying at one end a frusto-conical sleeve 6, which constitutes the shelling-cone. This sleeve is provided at its outer edge with serrations 7, and it has a plurality of suitably-disposed perforations 8 for the escape of the kernels of corn. In addition to the perforations 8 the sleeve 6 is provided with numerous screw-threaded openings 9, disposed intermediate the openings 8, and in said screw-threaded openings are disposed screw-threaded plugs 10, the inner ends of which are sharpened to form teeth 11 for the purpose of engaging the kernels of the corn and removing the same from the cob, as will be presently more fully described. When the device is made as a casting, these teeth may be formed integrally with the sleeve, as will be readily understood, and I reserve the privilege of forming them in this or any other convenient manner.

The sleeve or shelling-cone 6 is securely and permanently mounted upon one end of the shaft 5, and the other end of said shaft projects beyond the tubular bearing in which it is journaled, said projecting end being squared to receive the crank-handle 12, by means of which it may be manipulated. This crank-handle is secured detachably by means of a pin 14 in order that the parts of the device may be disconnected for convenience in shipment and storage. The tubular bearing 2 is provided with openings 15 for the admission of lubricating material.

The operation and advantages of my invention will be readily understood by reference to the foregoing description, taken in connection with the drawings hereto annexed. When the device has been mounted for operation and it is desired to operate upon the ears of corn which have been selected for seed-corn, said ears are grasped by one hand and their pointed ends, usually carrying the small seeds, are inserted into the shelling-cone, the crank-shaft 5 carrying said cone being rotated by the other hand of the operator. In this manner the small seeds may be quickly and easily removed, the interiorly-located pointed teeth acting upon the small end of the ear, while the serrated edge of the shelling-cone will operate annularly upon the ear of corn until all the small seeds which it is desired to separate from the seed-corn have been removed. It oftentimes happens that the seeds at the butt-end of the corn are likewise objectionable as seed-corn owing to immaturity or insufficient development, and such seeds may be readily removed by the action of the serrated edge of the shelling-cone, to which the butt-end of the ear may be presented.

It will be understood that this device is mainly intended for the purpose of removing from the cob such of the kernels as it is desired not to use for seed-corn. Usually this work has been effected by hand and in a tedious and slow manner, which has, moreover, been objectionable on account of the injury to the hands that is liable to occur, such as blistering and soreness. By my invention these objections are avoided, and the work may be performed in a much more rapid and satisfactory manner than by hand.

Having thus described my invention, I claim—

1. In a device of the class described, a shelling-cone consisting of a frusto-conical sleeve having perforations in the walls thereof, interiorly-disposed teeth, and a serrated edge.

2. In a device of the class described, a shelling-sleeve having openings for the escape of corn and a plurality of threaded orifices, screw-threaded plugs engaging said orifices and having sharpened inner ends, and serrations formed upon the outer edge of the sleeve.

3. In a device of the class described, an interiorly-contracted shelling-cone having interiorly-disposed teeth and a serrated outer edge.

4. In a device of the class described, a shelling-sleeve having means to effect the removal of the kernels from an ear of corn presented thereto and openings for the passage of said kernels, said sleeve being closed at its inner end to prevent the passage therethrough of the cob and serrated at its outer edge.

In testimony that I claim the foregoing as my own I have hereto affixed my signature in the presence of two witnesses.

JOSEPH R. DUHACHEK.

Witnesses:
W. A. WITZIGMAN,
MAUDE DEUEL.